US012621047B2

(12) United States Patent
Fan et al.

(10) Patent No.: US 12,621,047 B2
(45) Date of Patent: May 5, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Jiangsheng Fan, Dongguan (CN); Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 254 days.

(21) Appl. No.: 18/198,012

(22) Filed: May 16, 2023

(65) Prior Publication Data

US 2023/0283361 A1      Sep. 7, 2023

Related U.S. Application Data

(63) Continuation of application No. PCT/CN2021/071931, filed on Jan. 14, 2021.

(51) Int. Cl.
*H04B 7/185*      (2006.01)
*H04W 36/08*      (2009.01)

(52) U.S. Cl.
CPC ...... *H04B 7/18519* (2013.01); *H04W 36/083* (2023.05)

(58) Field of Classification Search
CPC ............ H04B 7/18519; H04B 7/18513; H04B 7/18541; H04W 36/083; H04W 84/06; H04W 36/0094
See application file for complete search history.

(56) References Cited

U.S. PATENT DOCUMENTS 5,561,838 A      10/1996   Chandos et al.
2019/0350023 A1   11/2019   Novlan et al.
(Continued)

FOREIGN PATENT DOCUMENTS

CN        108112281 A      6/2018
CN        108243391 A      7/2018
(Continued)

OTHER PUBLICATIONS

International Search Report and Written Opinion dated Oct. 12, 2021 in International Application No. PCT/CN2021/071931. English translation attached.
(Continued)

*Primary Examiner* — Dhaval V Patel
(74) *Attorney, Agent, or Firm* — Sheppard, Mullin, Richter & Hampton LLP

(57) ABSTRACT

The embodiments of the present disclosure provide a wireless communication method, a terminal device, and a network device. The network device can learn a difference between propagation delays from a serving satellite and a neighbor satellite to a terminal, thereby optimizing neighbor cell measurement configuration. The wireless communication method includes: transmitting, by a terminal device, first information including at least one of: signal propagation distance information from a serving satellite and a neighbor satellite of the serving satellite to the terminal device; signal propagation delay information from the serving satellite and the neighbor satellite of the serving satellite to the terminal device; or signal quality of the serving satellite and/or at least one neighbor satellite of the serving satellite as measured by the terminal device.

20 Claims, 5 Drawing Sheets

100

(56) References Cited

U.S. PATENT DOCUMENTS

| | | | |
|---|---|---|---|
| 2022/0030532 A1 | 1/2022 | Hajir et al. | |
| 2023/0023056 A1 | 1/2023 | Ma et al. | |
| 2023/0050226 A1* | 2/2023 | Wyckoff | H04J 13/0077 |
| 2024/0040457 A1* | 2/2024 | Hong | H04W 36/083 |
| 2024/0098588 A1* | 3/2024 | Da Silva | H04W 36/24 |
| 2024/0406816 A1 | 12/2024 | Deenoo et al. | |

FOREIGN PATENT DOCUMENTS

| | | |
|---|---|---|
| CN | 109041098 A | 12/2018 |
| CN | 110536341 A | 12/2019 |
| CN | 110809292 A | 2/2020 |
| CN | 111278042 A | 6/2020 |
| CN | 111711973 A | 9/2020 |
| CN | 115669055 A | 1/2023 |
| KR | 20200066167 A | 6/2020 |

OTHER PUBLICATIONS

3rd Generation Partnership Project; Technical Specification Group Radio Access Network; NR; Radio Resource Control (RRC) protocol specification (Release 16), 3GPP TS 38.331 V16.2.0, Oct. 8, 2020, 5.3 and/or 5.7 and/or 6.2.2 and/or 6.3.2.

Extended European Search Report dated Feb. 8, 2024 received in European Patent Application No. EP21918483.5.

OPPO: "Discussion on mobility management for connected mode UE in NTN",3GPP Draft; R2-2006784, 3rd Generation Partnership Project (3GPP), Mobile Competence Centre; 650, Route Des Lucioles; F-06921 Sophia-Antipolis Cedex; France vol. RAN WG2, No. Electronic; Aug. 17, 2020-Aug. 28, 2020 Aug. 7, 2020 (Aug. 7, 2020), XP052359905.

"3rd Generation Partnership Project; Technical Specification Group Radio Access Network; Solutions for NR to supportnon-terrestrial networks (NTN) (Release 16) ", 3GPP Standard; Technical Report; 3GPP TR38.821, 3rd Generation Partnership Project (3GPP), Mobile Competence Centre ; 650, Route Des Lucioles ; F-06921 Sophia-Antipolis Cedex; France vol. RAN WG3, No. V16.0.0 ,Jan. 16, 2020 (Jan. 16, 2020), pp. 1-140,XP051860814.

PCT International Search Report for International Application No. PCT/CN2020/106588 dated Apr. 29, 2021.

PCT Written Opinion for International Application No. PCT/CN2020/106588 dated Apr. 29, 2021.

"Report of Email Discussion [107#62][NR/NTN] TP Mobility", InterDigital Inc. (Email discussion rapporteur), 3GPP RAN WG2 Meeting #107bis R2-1913604, sections 2.3, 3.1 and 3.7, dated Oct. 14, 2019.

"Discussion on SSB measurement in NTN" of Huawei, HiSilicon, 3GPP TSG-RAN2 Meeting #108 R2-1915189, sections 2-5, dated Nov. 18, 2019.

"Solutions for NR to support non-terrestrial networks (NTN)" of Thales, 3GPP TSG RAN meeting #86 RP-193234 dated Dec. 9, 2019.

"The Impact by Propagation Delay Difference on Connected Mode" of CATT, 3GPP TSG-RAN WG2 Meeting #107 R2-1908755 dated Aug. 26, 2019.

Extended European Search Report for European application No. 20948001.1 dated Sep. 5, 2023.

Intention to Grant for European application No. 20948001.1 dated Jun. 24, 2024.

First Office Action for Chinese application No. 202310386659.4 dated Jul. 25, 2024.

Supplementary European Search Report for European application No. 21918483.5 dated Feb. 8, 2024.

Non-final Office Action for US Patent No. U.S. Appl. No. 18/198,012 dated Jul. 16, 2025.

Non-final Office Action for U.S. Pat. No. 18100,189 dated Apr. 21, 2025.

Notice of priority examination of patent application for Chinese application No. 202310386659.4 dated Jul. 1, 2024.

Final Office Action for U.S. Appl. No. 18/100,189 dated Oct. 30, 2025.

Advisory Action for U.S. Appl. No. 18/100,189 dated Jan. 29, 2026.

Notice of Allowance for U.S. Appl. No. 18/100,189 dated Mar. 25, 2026.

* cited by examiner

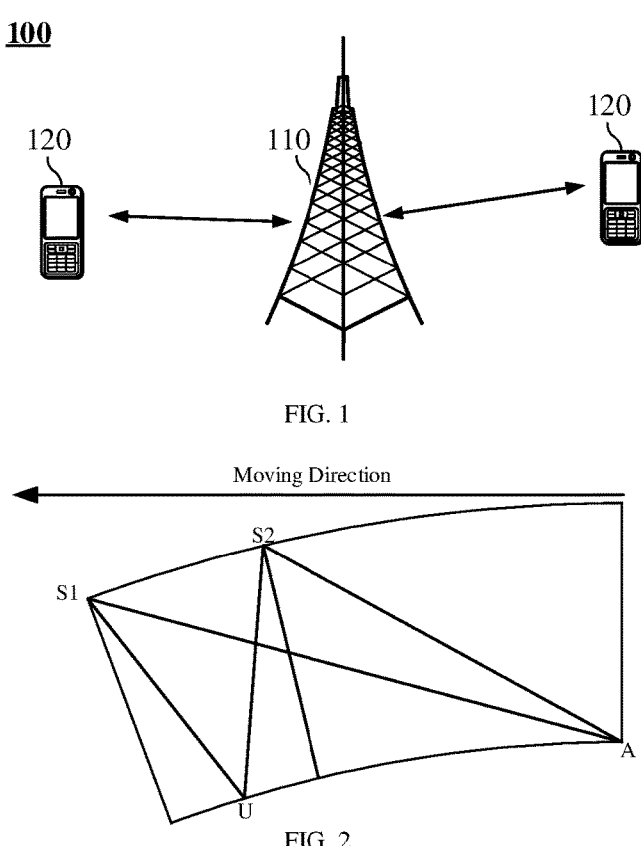

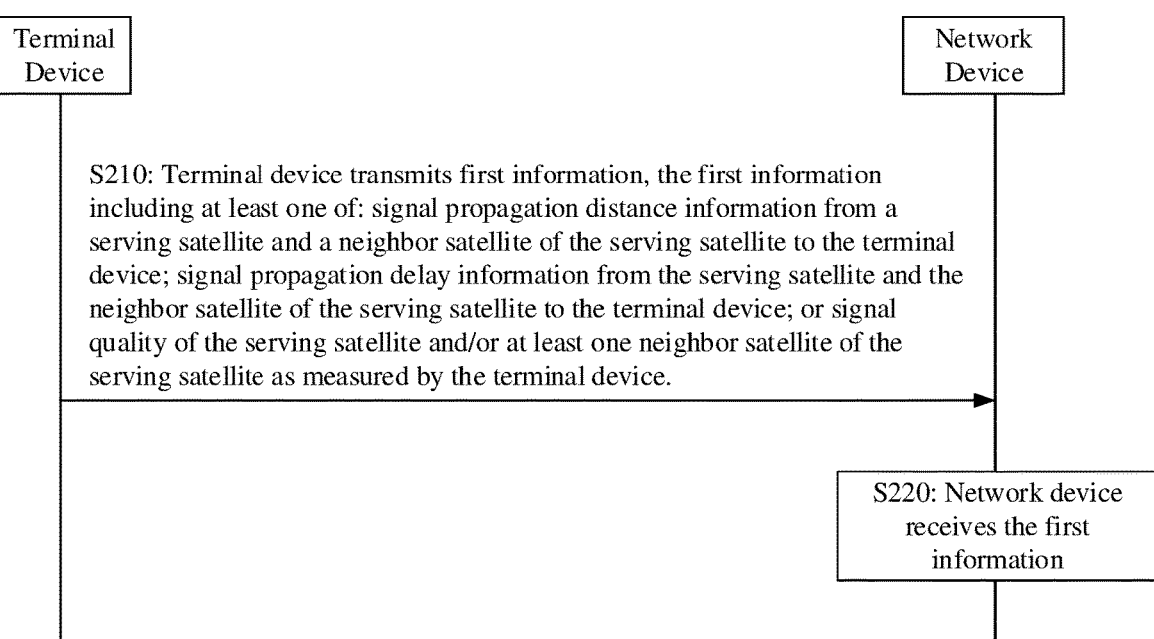

| Terminal Device | | Network Device |
|---|---|---|

S210: Terminal device transmits first information, the first information including at least one of: signal propagation distance information from a serving satellite and a neighbor satellite of the serving satellite to the terminal device; signal propagation delay information from the serving satellite and the neighbor satellite of the serving satellite to the terminal device; or signal quality of the serving satellite and/or at least one neighbor satellite of the serving satellite as measured by the terminal device.

S220: Network device receives the first information

FIG. 3

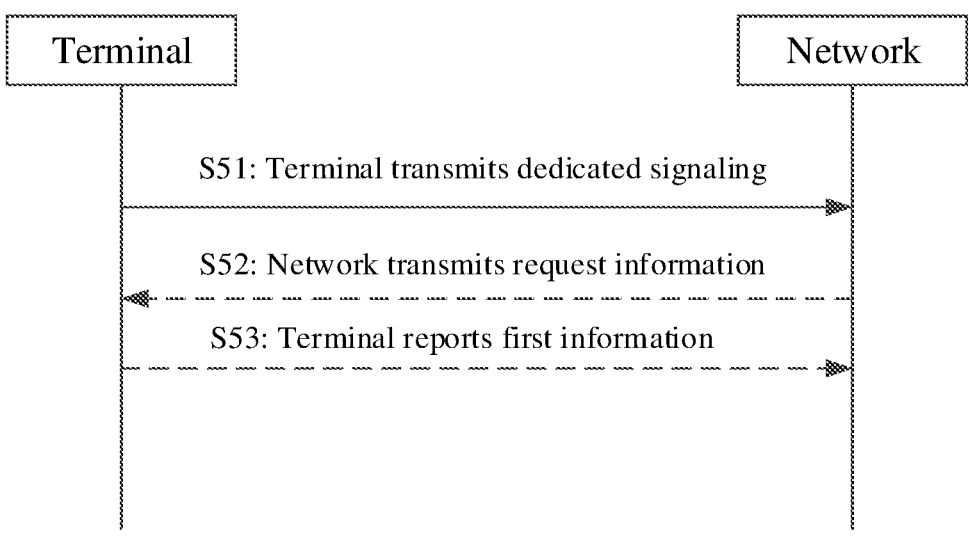
S51: Terminal transmits dedicated signaling
S52: Network transmits request information
S53: Terminal reports first information
FIG. 8
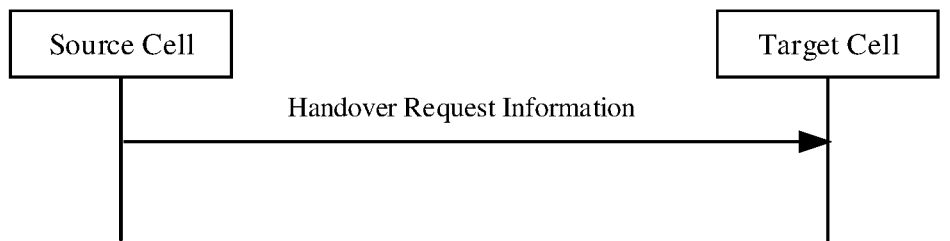
Handover Request Information
FIG. 9
Terminal Device 300
Communication Unit 310
FIG. 10
Network Device 400
Communication Unit 410
FIG. 11

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2021/071931 filed on Jan. 14, 2021, the entire disclosure of which is incorporated herein by reference.

TECHNICAL FIELD

The embodiments of the present disclosure relate to communication technology, and more particularly, to a wireless communication method, a terminal device and a network device.

BACKGROUND

The $5^{th}$ Generation mobile communication technology New Radio (5G NR) system defines Non-Terrestrial Network (NTN) system deployment scenarios including satellite networks. With the wide-area coverage capabilities of satellites, the NTN system can provide the continuity of 5G NR services. However, in the NTN scenario, since the network cannot always obtain the precise location of the terminal, a difference between propagation delays from different satellites to a terminal is unknown, which brings new challenges to neighbor cell measurement configuration.

SUMMARY

The embodiments of the present disclosure provide a wireless communication method, a terminal device, and a network device. The network device can learn a difference between propagation delays from a serving satellite and a neighbor satellite to a terminal, thereby optimizing neighbor cell measurement configuration.

In a first aspect, a wireless communication method is provided. The method includes:

transmitting, by a terminal device, first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In a second aspect, a wireless communication method is provided. The method includes:

receiving, by a network device, first information transmitted by a terminal device, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In a third aspect, a terminal device is provided. The terminal device is configured to perform the method according to the above first aspect.

In particular, the terminal device includes one or more functional modules configured to perform the method according to the above first aspect.

In a fourth aspect, a network device is provided. The network device is configured to perform the method according to the above second aspect.

In particular, the network device includes one or more functional modules configured to perform the method according to the above second aspect.

In a fifth aspect, a terminal device is provided. The terminal device includes a processor and a memory. The memory stores a computer program, and the processor is configured to invoke and execute the computer program stored in the memory to perform the method according to the above first aspect.

In a sixth aspect, a network device is provided. The network device includes a processor and a memory. The memory stores a computer program, and the processor is configured to invoke and execute the computer program stored in the memory to perform the method according to the above second aspect.

In a seventh aspect, an apparatus is provided. The apparatus is configured to perform the method according to any of the above first and second aspects.

In particular, the apparatus includes a processor configured to invoke and execute a computer program from a memory, to cause a device provided with the apparatus to perform the method according to any of the above first and second aspects.

In an eighth aspect, a computer-readable storage medium is provided. The computer-readable storage medium stores a computer program that causes a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, the terminal device can report at least one of the signal propagation distance information from the serving satellite and the neighbor satellite to the terminal device, the signal propagation delay information from the serving satellite and the neighbor satellite to the terminal device, or the measured signal quality of the serving satellite and/or at least one neighbor satellite, such that the network device can know the difference between the propagation delays from the serving satellite and the neighbor satellite to the terminal, and the network device can configure an SMTC and a measurement gap for the terminal device while considering the difference between the propagation delays from the serving satellite and the neighbor satellite to the terminal, so as to optimize the neighbor cell measurement configuration and ensure the quality measurement by the terminal.

BRIEF DESCRIPTION OF DRAWINGS

FIG. 1 is a schematic diagram showing an architecture of a communication system in which an embodiment of the present disclosure.

FIG. 2 is a schematic diagram showing a propagation delay between transparent payload satellite links according to an embodiment of the present disclosure.

FIG. 3 is a flowchart illustrating a wireless communication method according to an embodiment of the present disclosure.

FIGS. 4-8 are schematic diagrams showing a terminal device reporting first information according to embodiments of the present disclosure.

FIG. 9 is a schematic diagram showing a source cell transmitting handover request information according to an embodiment of the present disclosure.

FIG. 10 is a schematic block diagram of a terminal device according to an embodiment of the present disclosure.

FIG. 11 is a schematic block diagram of a network device according to an embodiment of the present disclosure.

DESCRIPTION OF EMBODIMENTS

Figure 4:
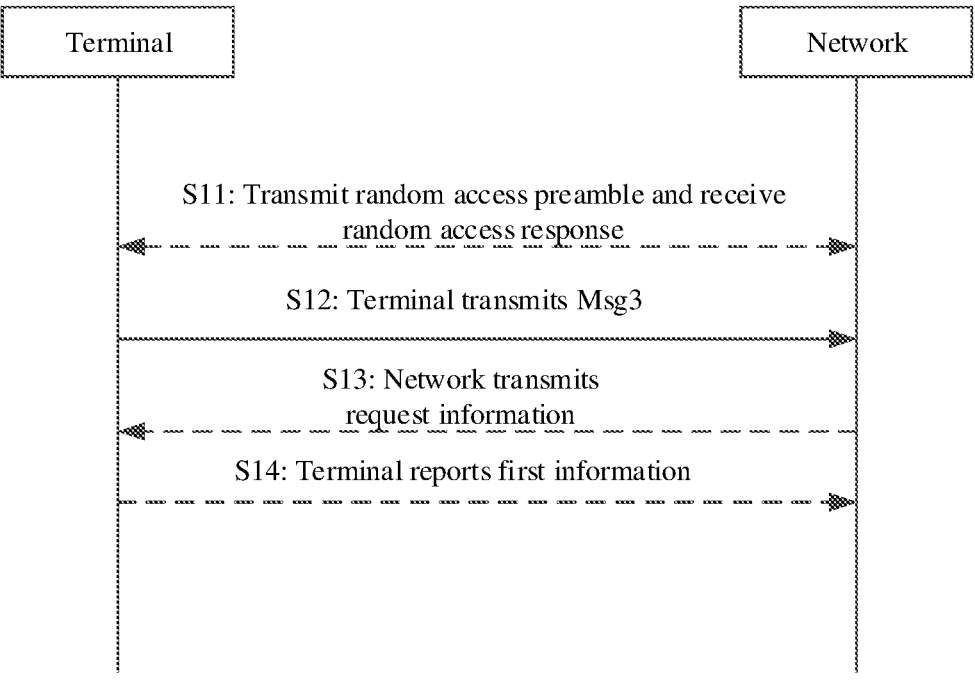

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In the 5G network environment, in order to reduce air interface signaling and quickly restore wireless connections and data services, a new Radio Resource Control (RRC) state is defined, RRC_INACTIVE state. This state is different from RRC_IDLE and RRC_CONNECTED) states. In RRC_IDLE, mobility is UE-based cell selection and reselection, paging is initiated by a Core Network (CN), and the paging area is configured by the CN. There is no UE Access Stratum (AS) context at the base station, and there is no RRC connection. In RRC_CONNECTED, there is an RRC connection, and the base station and the UE have the UE AS context. The network device knows the location of the UE at the specific cell level. Mobility is mobility controlled by network device. Unicast data can be transmitted between the UE and the base station. In RRC_INACTIVE, mobility is based on UE-based cell selection and reselection, there is a connection between CN-NR, there is UE AS context on a certain base station, paging is triggered by a Radio Access Network (RAN), and RAN-based paging area is managed by the RAN, and the network device knows the location of the UE at the RAN-based paging area level.

In order to better understand the embodiments of the present disclosure, the measurement principles related to the present disclosure will be described.

A terminal device obtains signal quality parameters of a cell by measuring a reference signal transmitted by a network, including Reference Signal Received Power (RSRP)/Reference Signal Received Quality (RSRQ)/Signal to Interference plus Noise Ratio (SINR), but SINR is only measured for terminals in the connected state. There are two types of reference signals: Synchronization Signal Block (SSB)/ Channel State Information Reference Signal (CSI-RS).

It should be noted that the SSB may also be referred to a synchronization signal/physical broadcast channel block (SS/PBCH block).

The measurement behavior of the terminal device is carried out according to frequency points, but since reference signals of a cell are periodically configured in the time dimension, in order to assist the terminal to quickly find a measurement reference signal of a neighbor cell, the serving cell will provide time dimension configuration information of the reference signal of the neighbor cell, Synchronization Measurement Timing Configuration (SMTC). The SMTC configuration information is configured at granularity of frequency points, after obtaining the SMTC configuration information of a frequency point, the terminal device only needs to search for the reference signal at the frequency point according to the SMTC configuration information.

The SMTC configuration contains the following parameters:

a measurement reference signal period, an offset of a measurement reference signal start point relative to a measurement reference period, and a duration of the measurement reference signal within a measurement reference period. The maximum duration of the measurement reference signal in the SMTC configuration can be up to 5 ms, and the SMTC configuration information may also be referred to as an SMTC window.

The SMTC configuration information is typically configured based on time of a Primary Cell (PCell). Due to the small cell coverage of the terrestrial cellular system, in an overlapping coverage area of cells, the delay difference between two cells reaching the overlapping coverage area of the cells is very small, typically on the order of microseconds (μs), whereas the SMTC window is on the order of milliseconds (ms). Therefore, when the terminal is measuring in the terrestrial system, the deviation caused by the propagation delay difference between terrestrial cells to the SMTC window is basically negligible.

For measurement by a terminal in the connected state, the network not only needs to configure the SMTC window corresponding to the measurement frequency point for the terminal, but also needs to configure a Measurement Gap (MG), because the terminal needs to receive data in the connected state. A terminal with only a single receiving antenna is not capable of receiving connected state data and measuring a signal from a neighbor cell/neighbor frequency at the same time. Hence, the network needs to coordinate the resources scheduled for data and measurement. During the measurement gap, the terminal does not receive user data scheduled by the network, and the network does not transmit user data during this period. Similarly, outside the measurement gap, the terminal cannot measure a signal from the neighbor cell/neighbor frequency, which would otherwise affect user data reception. The network decides when to schedule the data based on implementation. The measurement gap window can be configured as up to 6 ms.

For measurement by a terminal in the idle state or inactive state, compared with the measurement in the connected state, the network only broadcasts frequency point information on a frequency point to be measured and an SMTC configuration associated with the frequency point via system information, and will not configure any measurement gap information. Therefore, the terminal in the idle state or the inactive state does not need to receive any user data transmitted by the network, and the terminal can decide when to complete the corresponding signal measurement for neighbor cell/neighbor frequency based on the SMTC configuration depending on implementation.

To facilitate better understanding of the embodiments of the present disclosure, the propagation delay difference between transparent payload satellite links related to the present disclosure will be described.

As shown in FIG. 2. A represents a gateway station (basically equivalent to a base station), S1 represents Satellite 1, S2 represents Satellite 2, Point U represents the location of the terminal, a solid line A-S1-U represents a signal link for the gateway station to communicate with a terminal via forwarding by Satellite 1, as represented by L1, a dotted line A-S2-U represents a signal link for the gateway station to communicate with the terminal via forwarding by Satellite 2, as represented by L2. Unlike the terrestrial system, the distance difference between L1 and L2 may be very large, up to 0 to several thousand kilometers. In other words, the difference between propagation delays caused by two satellite signal forwarding links can reach 0 to tens of ms (the propagation speed of electromagnetic waves in the air is about 300 km/ms), such a difference between propagation delays is even larger than the SMTC configuration window (at maximum 5 ms)/measurement gap window (at maximum 6 ms). Moreover, different terminals are located in different geographical locations, and experience different differences in propagation delays between satellites.

It should be noted that for a transparent payload satellite, the link between the terminal and the satellite is called a service link, and the link between the gateway station and the satellite is called a feeder link.

For the terrestrial communication system, due to the small cell coverage of the terrestrial cellular system, in the overlapping coverage area of the cells, the delay difference between two cells reaching the overlapping coverage area of the cells is very small, typically on the order of microseconds (μs), whereas the SMTC window is on the order of milliseconds (ms). Therefore, when the terminal is measuring in the terrestrial system, the deviation caused by the propagation delay difference between terrestrial cells to the SMTC window is basically negligible.

The propagation delay difference between transparent payload satellites (0 to tens of ms) is even larger than the SMTC configuration window (at maximum 5 ms)/measurement gap window (at maximum 6 ms). Since the terminal cannot obtain the geographic location information of the gateway station, the terminal cannot calculate the path propagation delay difference value between the current serving satellite and the neighbor satellite, and the SMTC configuration corresponding to the frequency point of the neighbor satellite configured by the serving cell is configured according to the time of the serving cell itself, without considering the path propagation delay difference value between the serving satellite and the neighbor satellite. The terminal cannot find the neighbor cell measurement reference signal forwarded by the neighbor satellite based on the SMTC time window configuration configured by the serving satellite, resulting in the failure of the terminal to measure the neighbor cell reference signal and in turn to perform subsequent mobility control.

Therefore, there is a need for a mechanism for the serving cell to consider the path propagation delay difference between the current serving satellite and the neighbor satellite when configuring the SMTC configuration and measurement gap configuration for the terminal, so as to configure an adjusted SMTC configuration and measurement gap configuration for the terminal, which can be used to measure the neighbor cell measurement reference signal.

It is assumed that the serving cell can obtain the propagation delay difference value between feeder links based on the location of the gateway station and the satellite orbit data information (also called ephemeris information). However, the propagation delay difference value between service links from the satellites to the terminal is still unknown since the network cannot always obtain the precise location of the terminal. In the related art, there is no mechanism for the terminal to feed back the propagation delay difference value between the service links from the satellites to the terminal to the network, and the network cannot configure the appropriate SMTC configuration and measurement gap configuration of the neighbor cell measurement reference signal for the terminal.

In view of the above problems, the present disclosure provides a scheme for a terminal device to report auxiliary information. The terminal device can report at least one of the signal propagation distance information from the serving satellite and the neighbor satellite to the terminal device, the signal propagation delay information from the serving satellite and the neighbor satellite to the terminal device, or the measured signal quality of the serving satellite and/or at least one neighbor satellite, such that the network device can know the difference between the propagation delays from the serving satellite and the neighbor satellite to the terminal, and the network device can configure an SMTC and a measurement gap for the terminal device while considering the difference between the propagation delays from the serving satellite and the neighbor satellite to the terminal, so as to optimize the neighbor cell measurement configuration and ensure the quality measurement by the terminal.

The technical solutions of the present disclosure will be described in detail below with reference to specific embodiments.

FIG. 3 is a schematic flowchart illustrating a wireless communication method 200 according to an embodiment of the present disclosure. As shown in FIG. 3, the method 200 may include at least part of the following content.

At S210, a terminal device transmits first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

At S220, a network device receives the first information.

In the embodiment of the present disclosure, the network device can know the difference between signal propagation delays from the serving satellite and the neighbor satellite to the terminal based on the signal propagation distance information from the serving satellite and the neighbor satellite to the terminal device, or the signal propagation delay information from the serving satellite and the neighbor satellite of the serving satellite to the terminal device, or the signal quality of the serving satellite and/or at least one neighbor satellite of the serving satellite as measured by the terminal device. Therefore, the network device can configure an SMTC and a measurement gap for the terminal device while considering the difference between the propagation delays from the serving satellite and the neighbor satellite to the terminal, so as to optimize the neighbor cell measurement configuration and ensure the quality measurement by the terminal.

It should be noted that one serving satellite may be associated with one or more neighbor satellites. That is, the serving satellite may have one or more neighbor satellites. The signal propagation distance information included in the above first information may be signal propagation distance information from a specific neighbor satellite associated with the serving satellite to the terminal device, or the signal propagation distance information included in the above first information may be signal propagation distance information from any neighbor satellite associated with the serving satellite to the terminal device, or the signal propagation distance information included in the above first information may be signal propagation distance information from all neighbor satellites associated with the serving satellite to the terminal device. The signal propagation delay information included in the above first information is similar to the signal propagation distance information, and reference may be made to the related description of the signal propagation distance information included in the first information, and details thereof will be omitted here.

In some embodiments, the signal propagation distance information included in the first information may include at least one of:

a signal propagation distance between the terminal device and the serving satellite, and a signal propagation distance between the terminal device and the neighbor satellite;

a difference between the signal propagation distance between the terminal device and the serving satellite and the signal propagation distance between the terminal device and the neighbor satellite; or a changing rate of the difference between the signal propagation distance between the terminal device and the serving satellite and the signal propagation distance between the terminal device and the neighbor satellite.

In some embodiments, the signal propagation delay information included in the first information may include at least one of:

a signal propagation delay between the terminal device and the serving satellite, and a signal propagation delay between the terminal device and the neighbor satellite;

a difference between the signal propagation delay between the terminal device and the serving satellite and the signal propagation delay between the terminal device and the neighbor satellite; or a changing rate of the difference between the signal propagation delay between the terminal device and the serving satellite and the signal propagation delay between the terminal device and the neighbor satellite.

In some embodiments, the signal quality included in the first information may include at least one of:

a Reference Signal Received Power (RSRP) measurement result, a Reference Signal Received Quality (RSRQ) measurement result, or a Signal to Interference plus Noise Ratio (SINR) measurement result.

In some embodiments, the first information may be carried by one of:

a third message (Msg3) in a four-step random access procedure, a first message (MsgA) in a two-step random access procedure, or dedicated signaling for a connected state of the terminal device.

In some embodiments, before transmitting the first information, the terminal device may receive second information.

The second information may include at least one of:

indication information indicating whether the terminal device is required to report at least one of the signal propagation distance information, the signal propagation delay information, or the signal quality;

neighbor satellite ephemeris data list configuration information for at least one of the signal propagation distance information, the signal propagation delay information, or the signal quality required to be reported by the terminal device;

an activation condition for recording at least one of the signal propagation distance information, the signal propagation delay information, or the signal quality;

a trigger condition for reporting at least one of the signal propagation distance information, the signal propagation delay information, or the signal quality; or a format requirement for reporting at least one of the signal propagation distance information, the signal propagation delay information, or the signal quality.

That is, before the terminal device performs S210, the terminal device may receive the second information. For example, the terminal device may receive the second information transmitted by the network device.

Correspondingly, before the network device receives the first information, the network device may transmit the second information to the terminal device.

Specifically, the terminal device may determine the indication information indicating whether to report at least one of the signal propagation distance information, the signal propagation delay information, or the signal quality based on the second information; and/or the terminal device may obtain the neighbor satellite ephemeris data list configuration information for at least one of the signal propagation distance information, the signal propagation delay information, or the signal quality required to be reported by the terminal device based on the second information; and/or the terminal device may obtain the activation condition for recording at least one of the signal propagation distance information, the signal propagation delay information, or the signal quality based on the second information; and/or the terminal device may obtain the trigger condition for reporting at least one of the signal propagation distance information, the signal propagation delay information, or the signal quality based on the second information; and/or the terminal device may obtain the format requirement for reporting at least one of the signal propagation distance information, the signal propagation delay information, or the signal quality based on the second information.

In some embodiments, after receiving the second information, the terminal device may report at least one of the signal propagation distance information, the signal propagation delay information, or the signal quality based on the format requirement included in the second information. That is, after receiving the second information, the terminal device may transmit the first information based on the format requirement included in the second information.

In some embodiments, the neighbor satellite ephemeris data list configuration information in the second information may be neighbor satellite ephemeris original data list configuration information, or the neighbor satellite ephemeris data list configuration information may be neighbor satellite ephemeris original data index identification list configuration information.

It should be noted that the ephemeris data in the embodiment of the present disclosure is similar to the satellite orbit operation data and ephemeris commonly used in the satellite communication. Generally speaking, the meaning of the ephemeris is to inform the user of initial location state vector information of a satellite at a defined start time point. Usually, the start time point information is common and does not need to be bound to a specific satellite. Six other parameters are needed to characterize a satellite's orbital operation data, in which three parameters represent an absolute space location vector of the satellite and three other parameters represent a space velocity vector of the satellite. Then, after obtaining the orbital operation data of the satellite, theoretically, the spatial location information of the satellite at any time in the future can be accurately calculated and predicted.

For example, an optional configuration of the neighbor satellite ephemeris data list configuration information may be as shown in Table 1.

TABLE 1

| List Element 1 | List Element 2 | . . . | List Element N |
|---|---|---|---|
| Ephemeris Data 1 | Ephemeris Data 2 | . . . | Ephemeris Data N |

One list element in the above Table 1 corresponds to one piece of ephemeris data.

For example, an optional configuration of the neighbor satellite ephemeris data index identification list configuration information may be shown in Table 2 or Table 3. That is, the ephemeris data may be associated with index identification information. For example, in an explicit index method, one piece of ephemeris data is associated with one index identification, as shown in Table 2. As another example, in an implicit index method, all ephemeris data form a list, and one piece of ephemeris data is associated with an element position number value of the ephemeris data in the list, as shown in Table 3.

TABLE 2

| Index Identification 1 | Index Identification 2 | . . . | Index Identification N |
|---|---|---|---|
| Ephemeris Data 1 | Ephemeris Data 2 | . . . | Ephemeris Data N |

In the above Table 2, one piece of ephemeris data is associated with one index identification. Generally, a number of bits occupied by the index identification is less, and using the index identification can save system overhead when compared with using the ephemeris data.

TABLE 3

| List Element Position Number 1 | List Element Position Number 2 | . . . | List Element Position Number N |
|---|---|---|---|
| Ephemeris Data 1 | Ephemeris Data 2 | . . . | Ephemeris Data N |

One piece of ephemeris data in the above Table 3 is associated with an element position number value of the ephemeris data in the list. Usually, the value of the list element position number starts from 0 or 1. Using the list element position number information can save system overhead when compared with using the ephemeris data.

It should be noted that the parameter N in the above Table 1 to Table 3 is an integer greater than or equal to 1.

In some embodiments, the activation condition in the second information may include at least one of:

activating the recording periodically;

a distance between the terminal device and the serving satellite being greater than a first threshold;

a distance between the terminal device and the neighbor satellite being smaller than a second threshold;

the distance between the terminal device and the serving satellite being greater than a third threshold and the distance between the terminal device and the neighbor satellite being smaller than a fourth threshold;

an absolute value of a difference between a distance between the terminal device and the serving satellite and a distance between the terminal device and the neighbor satellite being smaller than a fifth threshold;

signal quality of the serving satellite being lower than a sixth threshold;

signal quality of the neighbor satellite being higher than a seventh threshold; or signal quality of part or all of the at least one neighbor satellite being higher than an eighth threshold.

In some embodiments, the trigger condition in the second information may include at least one of:

triggering the reporting periodically;

a distance between the terminal device and the serving satellite being greater than a ninth threshold;

a distance between the terminal device and the neighbor satellite being smaller than a tenth threshold;

the distance between the terminal device and the serving satellite being greater than an eleventh threshold and the distance between the terminal device and the neighbor satellite being smaller than a twelfth threshold;

an absolute value of a difference between a distance between the terminal device and the serving satellite and a distance between the terminal device and the neighbor satellite being smaller than a thirteenth threshold;

signal quality of the serving satellite being lower than a fourteenth threshold;

signal quality of the neighbor satellite being higher than a fifteenth threshold; or signal quality of part or all of the at least one neighbor satellite being higher than a sixteenth threshold.

It should be noted that some or all of the above first to sixteenth thresholds may be pre-configured or agreed in a protocol, or some or all of the above first to sixteenth thresholds may be configured or indicated by the network device.

In some embodiments, the format requirement in the second information may include at least one of:

reporting a signal propagation distance between the terminal device and the serving satellite, and a signal propagation distance between the terminal device and the neighbor satellite;

reporting a difference between the signal propagation distance between the terminal device and the serving satellite and the signal propagation distance between the terminal device and the neighbor satellite;

reporting a changing rate of the difference between the signal propagation distance between the terminal device and the serving satellite and the signal propagation distance between the terminal device and the neighbor satellite;

reporting a signal propagation delay between the terminal device and the serving satellite, and a signal propagation delay between the terminal device and the neighbor satellite;

reporting a difference between the signal propagation delay between the terminal device and the serving satellite and the signal propagation delay between the terminal device and the neighbor satellite;

reporting a changing rate of the difference between the signal propagation delay between the terminal device and the serving satellite and the signal propagation delay between the terminal device and the neighbor satellite; or reporting the signal quality of the serving satellite and/or the at least one neighbor satellite as measured by the terminal device.

In some embodiments, the second information may be carried by one of:

system information or dedicated signaling of the terminal device.

In some embodiments, before transmitting the first information, the terminal device may transmit third information. The third information indicates that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

That is, before the terminal device transmits the first information, the terminal device may transmit the third information to the network device; and the terminal device may transmit the first information to the network device based on a request from the network device.

Correspondingly, before receiving the first information, the network device may receive the third information transmitted by the terminal device. For example, after receiving the third information, the network device may request the first information from the terminal device.

In some embodiments, the network device may transmit handover request information for requesting handover to a target cell. The handover request information includes at least content included in the first information. Therefore, during a cell handover process, the target cell can know the difference between the propagation delays from the serving satellite and the neighbor satellite to the terminal in time, so as to facilitate the measurement configuration.

As Embodiment 1, the terminal device may implement the solution of the wireless communication method 200 according to the process flow shown in FIG. 4. Specifically, the process flow shown in FIG. 4 includes S11-S14.

At S11, the terminal device transmits a random access preamble and receives a random access response from the network. This process is optional, so it is represented by a dotted line.

At S12, the terminal device transmits a third message (Msg3) in the four-step random access procedure.

In Mode 1, the Msg3 may include first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In this case, S13 and S14 do not exist, so S13 and S14 are represented by dotted lines.

In Mode 2, the Msg3 includes third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

The network can further obtain the content stored in the third information via S13 and S14.

At S13, the network device transmits a request information to the terminal device. The request information is used to notify the terminal device that the network agrees to obtain the content stored in the third information. Optionally, the request information may carry configuration information regarding format or data type requirement of data to be reported.

At S14, the terminal device reports the above first information according to the configuration requirement of the network in S13.

Figure 5:
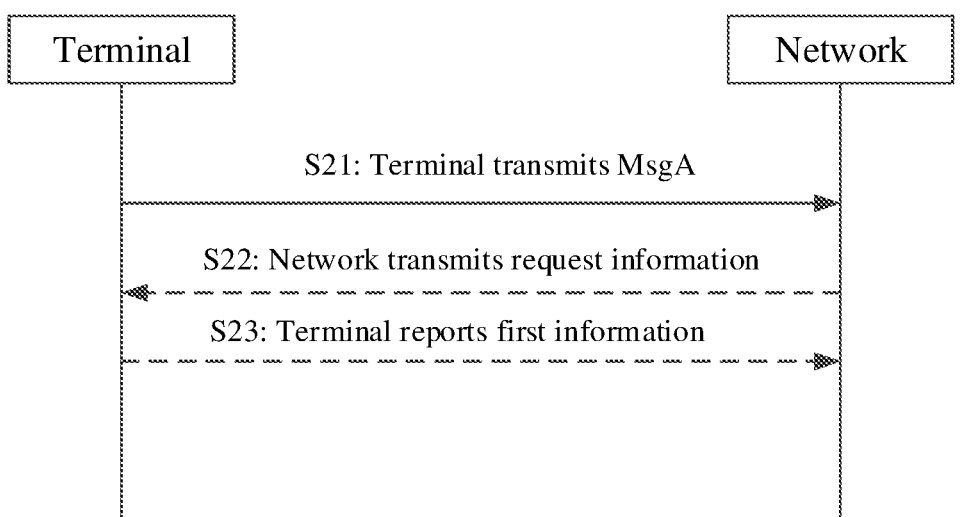

As Embodiment 2, the terminal device may implement the solution of the wireless communication method 200 according to the process flow shown in FIG. 5. Specifically, the process flow shown in FIG. 5 includes S21-S23.

At S21, the terminal device transmits a first message (MsgA) in the two-step random access procedure.

In Mode 1, the MsgA includes first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In this case, S22 and S23 do not exist, so S22 and S23 are represented by dotted lines.

In Mode 2, the MsgA includes third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

The network side can further obtain the content stored in the third information via S22 and S23.

At S22, the network device transmits a request information to the terminal device. The request information is used to notify the terminal device that the network agrees to obtain the content stored in the third information. Optionally, the request information may carry configuration information regarding format or data type requirement of data to be reported.

At S23, the terminal device reports the above first information according to the configuration requirement of the network in S22.

Figure 6:
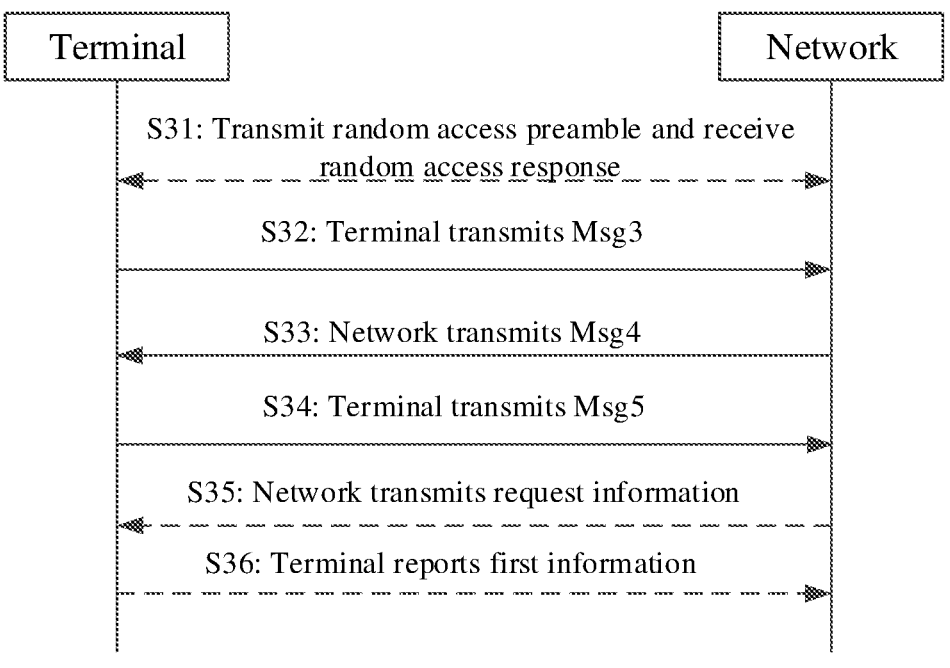

As Embodiment 3, the terminal device may implement the solution of the wireless communication method 200 according to the process flow shown in FIG. 6. Specifically, the process flow shown in FIG. 6 includes S31-S36.

At S31, the terminal device transmits a random access preamble and receives a random access response from the network. This process is optional, so it is represented by a dotted line.

At S32, the terminal device transmits a third message (Msg3) in the four-step random access procedure.

At S33, the network device transmits a fourth message (Msg4) in the four-step random access procedure.

At S34, the terminal device transmits a fifth message (Msg5) in the four-step random access procedure, and the Msg5 can also be referred to as connected-state dedicated signaling.

In Mode 1, the Msg5 may include first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In this case, S35 and S36 do not exist, so S35 and S36 are represented by dotted lines.

In Mode 2, the Msg5 includes third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

The network can further obtain the content stored in the third information via S35 and S36.

At S35, the network device transmits a request information to the terminal device. The request information is used to notify the terminal device that the network agrees to obtain the content stored in the third information. Optionally, the request information may carry configuration information regarding format or data type requirement of data to be reported.

At S36, the terminal device reports the above first information according to the configuration requirement of the network in S35.

Figure 7:
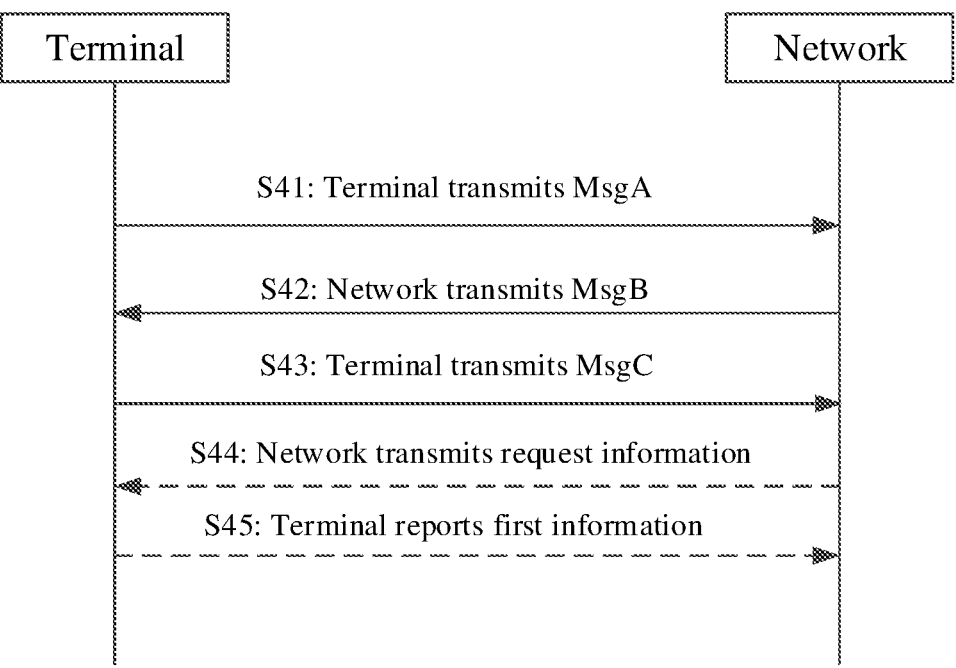

As Embodiment 4, the terminal device may implement the solution of the wireless communication method 200 according to the process flow shown in FIG. 7. Specifically, the process flow shown in FIG. 7 includes S41-S45.

At S41, the terminal device transmits a first message (MsgA) in the two-step random access procedure.

At S42, the network device transmits a second message (MsgB) in the two-step random access procedure.

At S43, the terminal device transmits a third message (MsgC) in the two-step random access procedure, and the MsgC can also be referred to as connected-state dedicated signaling.

In Mode 1, the MsgC may include first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In this case, S44 and S45 do not exist, so S44 and S45 are represented by dotted lines.

In Mode 2, the MsgC includes third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

The network can further obtain the content stored in the third information via S44 and S45.

At S44, the network device transmits a request information to the terminal device. The request information is used to notify the terminal device that the network agrees to obtain the content stored in the third information. Optionally, the request information may carry configuration information regarding format or data type requirement of data to be reported.

At S45, the terminal device reports the above first information according to the configuration requirement of the network in S44.

As Embodiment 5, the terminal device may implement the solution of the wireless communication method 200 according to the process flow shown in FIG. 8. Specifically, the process flow shown in FIG. 8 includes S51-S53.

At S51, the terminal device transmits dedicated signaling.

In Mode 1, the dedicated signaling may include first information, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In this case, S52 and S53 do not exist, so S52 and S53 are represented by dotted lines.

In Mode 2, the dedicated signaling includes third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

The network can further obtain the content stored in the third information via S52 and S53.

At S52, the network device transmits a request information to the terminal device. The request information is used to notify the terminal device that the network agrees to obtain the content stored in the third information. Optionally, the request information may carry configuration information regarding format or data type requirement of data to be reported.

At S53, the terminal device reports the above first information according to the configuration requirement of the network in S52.

As Embodiment 6, a network device (source cell) may transfer the content included in the first information obtained from the terminal to a target cell according to the process flow shown in FIG. 9. Specifically, the source cell may transmit handover request information for requesting handover to the target cell, and the handover request information may include at least the content included in the first information.

Therefore, in the embodiments of the present disclosure, the terminal device can report at least one of the signal propagation distance information from the serving satellite and the neighbor satellite to the terminal device, the signal propagation delay information from the serving satellite and the neighbor satellite to the terminal device, or the measured signal quality of the serving satellite and/or at least one neighbor satellite, such that the network device can know the difference between the propagation delays from the serving satellite and the neighbor satellite to the terminal, and the network device can configure an SMTC and a measurement gap for the terminal device while considering the difference between the propagation delays from the serving satellite and the neighbor satellite to the terminal, so as to optimize the neighbor cell measurement configuration and ensure the quality measurement by the terminal.

The method embodiments of the present disclosure have been described in detail above with reference to FIGS. 3-9, and the apparatus embodiments of the present disclosure will be described in detail below with reference to FIGS. 10-14. It can be appreciated that the apparatus embodiments and the method embodiments correspond to each other, and for similar descriptions, reference can be made to the method embodiments.

FIG. 10 shows a schematic block diagram of a terminal device 300 according to an embodiment of the present disclosure. As shown in FIG. 10, the terminal device 300 includes:

a communication unit 310 configured to transmit first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In some embodiments, the signal propagation distance information may include at least one of:

a signal propagation distance between the terminal device and the serving satellite, and a signal propagation distance between the terminal device and the neighbor satellite;

a difference between the signal propagation distance between the terminal device and the serving satellite and the signal propagation distance between the terminal device and the neighbor satellite; or a changing rate of the difference between the signal propagation distance between the terminal device and the serving satellite and the signal propagation distance between the terminal device and the neighbor satellite.

In some embodiments, the signal propagation delay information may include at least one of:

a signal propagation delay between the terminal device and the serving satellite, and a signal propagation delay between the terminal device and the neighbor satellite;

a difference between the signal propagation delay between the terminal device and the serving satellite and the signal propagation delay between the terminal device and the neighbor satellite; or a changing rate of the difference between the signal propagation delay between the terminal device and the serving satellite and the signal propagation delay between the terminal device and the neighbor satellite.

In some embodiments, the signal quality may include at least one of:

a Reference Signal Received Power (RSRP) measurement result, a Reference Signal Received Quality (RSRQ) measurement result, or a Signal to Interference plus Noise Ratio (SINR) measurement result.

In some embodiments, the first information may be carried by one of:

a third message in a four-step random access procedure, a first message in a two-step random access procedure, or dedicated signaling for a connected state of the terminal device.

In some embodiments, before transmitting the first information, the communication unit 310 may be further configured to receive second information; the second information including at least one of:

indication information indicating whether the terminal device is required to report at least one of the signal propagation distance information, the signal propagation delay information, or the signal quality;

neighbor satellite ephemeris data list configuration information for at least one of the signal propagation distance information, the signal propagation delay information, or the signal quality required to be reported by the terminal device;

an activation condition for recording at least one of the signal propagation distance information, the signal propagation delay information, or the signal quality;

a trigger condition for reporting at least one of the signal propagation distance information, the signal propagation delay information, or the signal quality; or a format requirement for reporting at least one of the signal propagation distance information, the signal propagation delay information, or the signal quality.

In some embodiments, the neighbor satellite ephemeris data list configuration information may be neighbor satellite ephemeris original data list configuration information, or the neighbor satellite ephemeris data list configuration information may be neighbor satellite ephemeris original data index identification list configuration information.

In some embodiments, the activation condition may include at least one of:

activating the recording periodically;

a distance between the terminal device and the serving satellite being greater than a first threshold;

a distance between the terminal device and the neighbor satellite being smaller than a second threshold;

the distance between the terminal device and the serving satellite being greater than a third threshold and the distance between the terminal device and the neighbor satellite being smaller than a fourth threshold;

an absolute value of a difference between a distance between the terminal device and the serving satellite and a distance between the terminal device and the neighbor satellite being smaller than a fifth threshold;

signal quality of the serving satellite being lower than a sixth threshold;

signal quality of the neighbor satellite being higher than a seventh threshold; or signal quality of part or all of the at least one neighbor satellite being higher than an eighth threshold.

In some embodiments, the trigger condition may include at least one of:

triggering the reporting periodically;

a distance between the terminal device and the serving satellite being greater than a ninth threshold;

a distance between the terminal device and the neighbor satellite being smaller than a tenth threshold;

the distance between the terminal device and the serving satellite being greater than an eleventh threshold and the distance between the terminal device and the neighbor satellite being smaller than a twelfth threshold;

an absolute value of a difference between a distance between the terminal device and the serving satellite and a distance between the terminal device and the neighbor satellite being smaller than a thirteenth threshold;

signal quality of the serving satellite being lower than a fourteenth threshold;

signal quality of the neighbor satellite being higher than a fifteenth threshold; or signal quality of part or all of the at least one neighbor satellite being higher than a sixteenth threshold.

In some embodiments, the format requirement may include at least one of:

reporting a signal propagation distance between the terminal device and the serving satellite, and a signal propagation distance between the terminal device and the neighbor satellite;

reporting a difference between the signal propagation distance between the terminal device and the serving satellite and the signal propagation distance between the terminal device and the neighbor satellite;

reporting a changing rate of the difference between the signal propagation distance between the terminal device and the serving satellite and the signal propagation distance between the terminal device and the neighbor satellite;

reporting a signal propagation delay between the terminal device and the serving satellite, and a signal propagation delay between the terminal device and the neighbor satellite;

reporting a difference between the signal propagation delay between the terminal device and the serving satellite and the signal propagation delay between the terminal device and the neighbor satellite;

reporting a changing rate of the difference between the signal propagation delay between the terminal device and the serving satellite and the signal propagation delay between the terminal device and the neighbor satellite; or reporting the signal quality of the serving satellite and/or the at least one neighbor satellite as measured by the terminal device.

In some embodiments, the second information may be carried by one of:

system information or dedicated signaling of the terminal device.

In some embodiments, before transmitting the first information, the communication unit 310 may be further configured to transmit third information, the third information indicating that at least one of the following is stored at the terminal device:

the signal propagation distance information from a serving satellite and a neighbor satellite of the serving satellite to the terminal device;

the signal propagation delay information from the serving satellite and the neighbor satellite of the serving satellite to the terminal device; or the signal quality of the serving satellite and/or at least one neighbor satellite of the serving satellite as measured by the terminal device.

Optionally, in some embodiments, the above communication unit may be a communication interface or a transceiver, or an input/output interface of a communication chip or a system-on-chip.

It can be appreciated that the terminal device 300 according to the embodiment of the present disclosure may correspond to the terminal device in the method embodiment of the present disclosure, and the above and other operations and/or functions of the respective units in the terminal device 300 are provided for the purpose of implementing the process flow corresponding to the terminal device in the method 200 shown in FIG. 3, and details thereof will be not omitted here for brevity.

FIG. 11 shows a schematic block diagram of a network device 400 according to an embodiment of the present disclosure. As shown in FIG. 11, the network device 400 includes:

a communication unit 410 configured to receive first information transmitted by a terminal device, the first information including at least one of:

signal propagation distance information from a serving satellite and a neighbor satellite of the serving satellite to the terminal device;

signal propagation delay information from the serving satellite and the neighbor satellite of the serving satellite to the terminal device; or signal quality of the serving satellite and/or at least one neighbor satellite of the serving satellite as measured by the terminal device.

In some embodiments, the signal propagation distance information may include at least one of:

a signal propagation distance between the terminal device and the serving satellite, and a signal propagation distance between the terminal device and the neighbor satellite;

a difference between the signal propagation distance between the terminal device and the serving satellite and the signal propagation distance between the terminal device and the neighbor satellite; or a changing rate of the difference between the signal propagation distance between the terminal device and the serving satellite and the signal propagation distance between the terminal device and the neighbor satellite.

In some embodiments, the signal propagation delay information may include at least one of:

a signal propagation delay between the terminal device and the serving satellite, and a signal propagation delay between the terminal device and the neighbor satellite;

a difference between the signal propagation delay between the terminal device and the serving satellite and the signal propagation delay between the terminal device and the neighbor satellite; or a changing rate of the difference between the signal propagation delay between the terminal device and the serving satellite and the signal propagation delay between the terminal device and the neighbor satellite.

In some embodiments, the signal quality may include at least one of:

a Reference Signal Received Power (RSRP) measurement result, a Reference Signal Received Quality (RSRQ) measurement result, or a Signal to Interference plus Noise Ratio (SINR) measurement result.

In some embodiments, the first information may be carried by one of:

a third message in a four-step random access procedure, a first message in a two-step random access procedure, or dedicated signaling for a connected state of the terminal device.

In some embodiments, before receiving the first information, the communication unit 410 may be further configured to transmit second information to the terminal device, the second information including at least one of:

indication information indicating whether the terminal device is required to report at least one of the signal propagation distance information, the signal propagation delay information, or the signal quality;

neighbor satellite ephemeris data list configuration information for at least one of the signal propagation distance information, the signal propagation delay information, or the signal quality required to be reported by the terminal device;

an activation condition for recording at least one of the signal propagation distance information, the signal propagation delay information, or the signal quality;

a trigger condition for reporting at least one of the signal propagation distance information, the signal propagation delay information, or the signal quality; or a format requirement for reporting at least one of the signal propagation distance information, the signal propagation delay information, or the signal quality.

In some embodiments, the neighbor satellite ephemeris data list configuration information may be neighbor satellite ephemeris original data list configuration information, or the neighbor satellite ephemeris data list configuration information may be neighbor satellite ephemeris original data index identification list configuration information.

In some embodiments, the activation condition may include at least one of:

activating the recording periodically;

a distance between the terminal device and the serving satellite being greater than a first threshold;

a distance between the terminal device and the neighbor satellite being smaller than a second threshold;

the distance between the terminal device and the serving satellite being greater than a third threshold and the distance between the terminal device and the neighbor satellite being smaller than a fourth threshold;

an absolute value of a difference between a distance
between the terminal device and the serving satellite
and a distance between the terminal device and the
neighbor satellite being smaller than a fifth threshold;
signal quality of the serving satellite being lower than a
sixth threshold;
signal quality of the neighbor satellite being higher than
a seventh threshold; or
signal quality of part or all of the at least one neighbor
satellite being higher than an eighth threshold.
In some embodiments, the trigger condition may include
at least one of:
triggering the reporting periodically;
a distance between the terminal device and the serving
satellite being greater than a ninth threshold;
a distance between the terminal device and the neighbor
satellite being smaller than a tenth threshold;
the distance between the terminal device and the serving
satellite being greater than an eleventh threshold and
the distance between the terminal device and the neigh-
bor satellite being smaller than a twelfth threshold;
an absolute value of a difference between a distance
between the terminal device and the serving satellite
and a distance between the terminal device and the
neighbor satellite being smaller than a thirteenth thresh-
old;
signal quality of the serving satellite being lower than a
fourteenth threshold;
signal quality of the neighbor satellite being higher than
a fifteenth threshold; or
signal quality of part or all of the at least one neighbor
satellite being higher than a sixteenth threshold.
In some embodiments, the format requirement may
include at least one of:
reporting a signal propagation distance between the ter-
minal device and the serving satellite, and a signal
propagation distance between the terminal device and
the neighbor satellite;
reporting a difference between the signal propagation
distance between the terminal device and the serving
satellite and the signal propagation distance between
the terminal device and the neighbor satellite;
reporting a changing rate of the difference between the
signal propagation distance between the terminal
device and the serving satellite and the signal propa-
gation distance between the terminal device and the
neighbor satellite;
reporting a signal propagation delay between the terminal
device and the serving satellite, and a signal propaga-
tion delay between the terminal device and the neigh-
bor satellite;
reporting a difference between the signal propagation
delay between the terminal device and the serving
satellite and the signal propagation delay between the
terminal device and the neighbor satellite;
reporting a changing rate of the difference between the
signal propagation delay between the terminal device
and the serving satellite and the signal propagation
delay between the terminal device and the neighbor
satellite; or
reporting the signal quality of the serving satellite and/or
the at least one neighbor satellite as measured by the
terminal device.
In some embodiments, the second information may be
carried by one of:
system information or dedicated signaling of the terminal
device.

24

Figure 12:
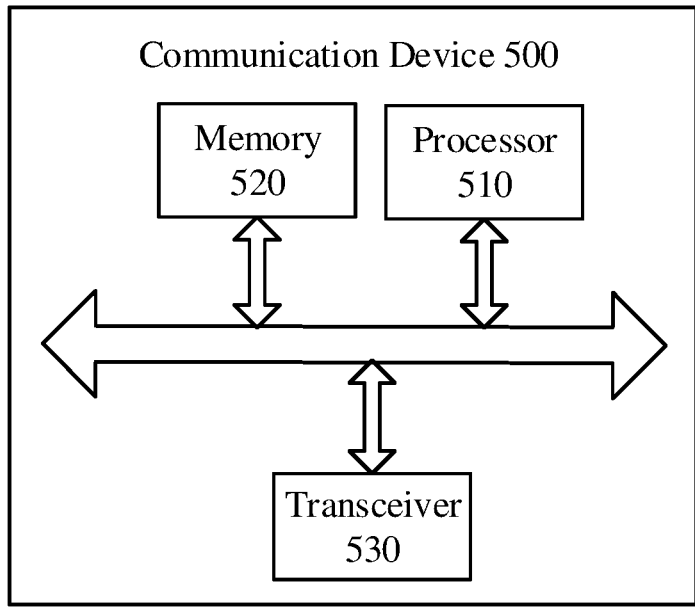
FIG. 12 is a schematic block diagram of a communication device according to an embodiment of the present disclosure.

In some embodiments, before receiving the first informa-
tion, the communication unit 410 may be further configured
to receive third information transmitted by the terminal
device, the third information indicating that at least one of
the following is stored at the terminal device:
the signal propagation distance information from a serv-
ing satellite and a neighbor satellite of the serving
satellite to the terminal device;
the signal propagation delay information from the serving
satellite and the neighbor satellite of the serving satel-
lite to the terminal device; or
the signal quality of the serving satellite and/or at least
one neighbor satellite of the serving satellite as mea-
sured by the terminal device.
In some embodiments, the communication unit 410 may
be further configured to transmit handover request informa-
tion for requesting handover to a target cell, the handover
request information including at least content included in the
first information.
Optionally, in some embodiments, the above communi-
cation unit may be a communication interface or a trans-
ceiver, or an input/output interface of a communication chip
or a system-on-chip.
It can be appreciated that the network device 400 accord-
ing to the embodiment of the present disclosure may corre-
spond to the network device in the method embodiment of
the present disclosure, and the above and other operations
and/or functions of the respective units in the network
device 400 are provided for the purpose of implementing the
process flow corresponding to the network device in the
method 200 shown in FIG. 3, and details thereof will be not
omitted here for brevity.
FIG. 12 is a schematic diagram showing a structure of a
communication device 500 according to an embodiment of
the present disclosure. The communication device 500
shown in FIG. 12 includes a processor 510, and the proces-
sor 510 can invoke and execute a computer program from a
memory to implement the method in the embodiment of the
present disclosure.
Optionally, as shown in FIG. 12, the communication
device 500 may further include a memory 520. The proces-
sor 510 can invoke and execute a computer program from
the memory 520 to implement the method in the embodi-
ment of the present disclosure.
The memory 520 may be a separate device independent
from the processor 510, or may be integrated in the proces-
sor 510.
Optionally, as shown in FIG. 12, the communication
device 500 may further include a transceiver 530, and the
processor 510 may control the transceiver 530 to commu-
nicate with other devices, and in particular, transmit infor-
mation or data to other devices, or receive information or
data transmitted by other devices.
Here, the transceiver 530 may include a transmitter and a
receiver. The transceiver 530 may further include one or
more antennas.
Optionally, the communication device 500 may specifi-
cally be the network device according to the embodiment of
the present disclosure, and the communication device 500
may implement the corresponding processes implemented
by the network device in any of the methods according to the
embodiments of the present disclosure. For the sake of
brevity, details thereof will be omitted here.
Optionally, the communication device 500 may specifi-
cally be the terminal device according to the embodiment of
the present disclosure, and the communication device 500
may implement the corresponding processes implemented by the terminal device in any of the methods according to the embodiments of the present disclosure. For the sake of brevity, details thereof will be omitted here.

Figure 13:
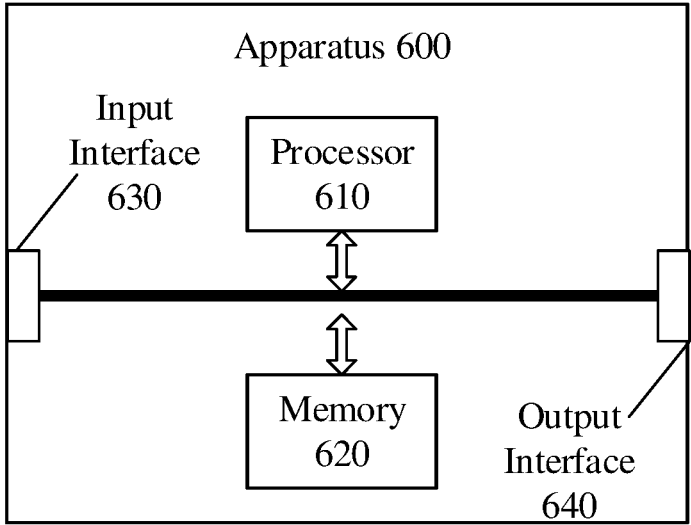
FIG. 13 is a schematic block diagram of an apparatus according to an embodiment of the present disclosure.

FIG. 13 is a schematic diagram showing a structure of an apparatus according to an embodiment of the present disclosure. The apparatus 600 shown in FIG. 13 includes a processor 610, and the processor 610 can invoke and execute a computer program from a memory to implement the method in the embodiment of the present disclosure.

Optionally, as shown in FIG. 13, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, e.g., system-level chip, a system-chip, a chip system, or a system-on-chip.

Figure 14:
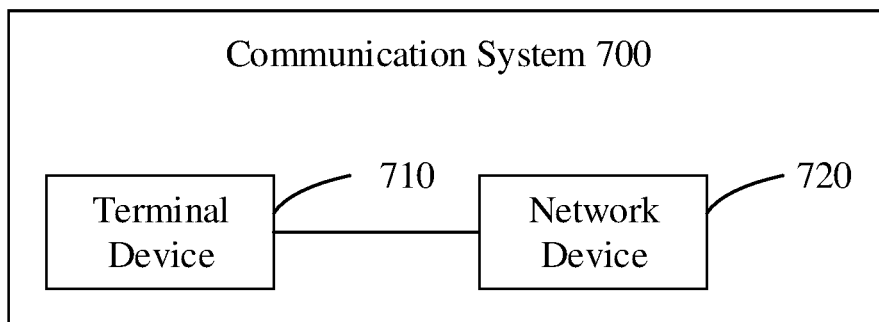
FIG. 14 is a schematic block diagram of a communication system according to an embodiment of the present disclosure.

FIG. 14 is a schematic block diagram showing a communication system 700 according to an embodiment of the present disclosure. As shown in FIG. 14, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
transmitting, by a terminal device, first information comprising at least one of:
service link propagation distance information from a serving cell and a neighbor cell to the terminal device;
service link propagation delay information from a serving cell and a neighbor cell to the terminal device; or
signal quality of a serving cell and/or at least one neighbor cell as measured by the terminal device,
wherein the method further comprises:
receiving, by the terminal device prior to transmitting the first information, second information, wherein
the second information comprises:
indication information indicating whether the terminal device is required to report at least one of the service link propagation distance information, the service link propagation delay information, or the signal quality; and
neighbor cell ephemeris data configuration information for at least one of the service link propagation distance information, the service link propagation delay information, or the signal quality required to be reported by the terminal device.

2. The method according to claim 1, wherein the service link propagation delay information comprises:
a difference between the service link propagation delay between the terminal device and the serving cell and the service link propagation delay between the terminal device and the neighbor cell.

3. The method according to claim 1, wherein the first information is carried by one of:
a third message in a four-step random access procedure, a first message in a two-step random access procedure, or dedicated signaling for a connected state of the terminal device.

4. The method according to claim 1, wherein the second information comprises at least one of:

an activation condition for recording at least one of the service link propagation distance information, the service link propagation delay information, or the signal quality;

a trigger condition for reporting at least one of the service link propagation distance information, the service link propagation delay information, or the signal quality; or a format requirement for reporting at least one of the service link propagation distance information, the service link propagation delay information, or the signal quality.

5. The method according to claim 1, wherein:

the neighbor cell ephemeris data configuration information is neighbor cell ephemeris original data configuration information, or the neighbor cell ephemeris data configuration information is neighbor cell ephemeris original data index identification configuration information.

6. The method according to claim 1, wherein the second information is carried by one of:

system information or dedicated signaling of the terminal device.

7. A wireless communication method, comprising:

receiving, by a network device, first information transmitted by a terminal device, the first information comprising at least one of:

service link propagation distance information from a serving cell and a neighbor cell to the terminal device;

service link propagation delay information from a serving cell and a neighbor cell to the terminal device; or signal quality of a serving cell and/or at least one neighbor cell as measured by the terminal device, wherein the method further comprises:

transmitting, by the network device prior to receiving the first information, second information to the terminal device, wherein the second information comprises:

indication information indicating whether the terminal device is required to report at least one of the service link propagation distance information, the service link propagation delay information, or the signal quality; and neighbor cell ephemeris data configuration information for at least one of the service link propagation distance information, the service link propagation delay information, or the signal quality required to be reported by the terminal device.

8. The method according to claim 7, wherein the service link propagation delay information comprises:

a difference between the service link propagation delay between the terminal device and the serving cell and the service link propagation delay between the terminal device and the neighbor cell.

9. The method according to claim 7, wherein the first information is carried by one of:

a third message in a four-step random access procedure, a first message in a two-step random access procedure, or dedicated signaling for a connected state of the terminal device.

10. The method according to claim 7, wherein the second information comprises at least one of:

an activation condition for recording at least one of the service link propagation distance information, the service link propagation delay information, or the signal quality;

a trigger condition for reporting at least one of the service link propagation distance information, the service link propagation delay information, or the signal quality; or a format requirement for reporting at least one of the service link propagation distance information, the service link propagation delay information, or the signal quality.

11. The method according to claim 7, wherein:

the neighbor cell ephemeris data configuration information is neighbor cell ephemeris original data configuration information, or the neighbor cell ephemeris data configuration information is neighbor cell ephemeris original data index identification configuration information.

12. The method according to claim 7, wherein the second information is carried by one of:

system information or dedicated signaling of the terminal device.

13. The method according to claim 7, further comprising:

transmitting, by the network device, handover request information for requesting handover to a target cell, the handover request information including at least content included in the first information.

14. A terminal device, comprising a processor and a memory, wherein the memory has a computer program stored thereon, and the processor is configured to invoke and execute the computer program stored in the memory to cause the terminal device to perform:

transmitting first information comprising at least one of:

service link propagation distance information from a serving cell and a neighbor cell to the terminal device;

service link propagation delay information from a serving cell and a neighbor cell to the terminal device; or signal quality of a serving cell and/or at least one neighbor cell as measured by the terminal device; and receiving, by the terminal device prior to transmitting the first information, second information, wherein the second information comprises:

indication information indicating whether the terminal device is required to report at least one of the service link propagation distance information, the service link propagation delay information, or the signal quality; and neighbor cell ephemeris data configuration information for at least one of the service link propagation distance information, the service link propagation delay information, or the signal quality required to be reported by the terminal device.

15. The terminal device according to claim 14, wherein the service link propagation delay information comprises:

a difference between the service link propagation delay between the terminal device and the serving cell and the service link propagation delay between the terminal device and the neighbor cell.

16. The terminal device according to claim 14, wherein the first information is carried by one of:

a third message in a four-step random access procedure, a first message in a two-step random access procedure, or dedicated signaling for a connected state of the terminal device.

17. The terminal device according to claim 14, wherein the second information comprises at least one of:

an activation condition for recording at least one of the service link propagation distance information, the service link propagation delay information, or the signal quality;

a trigger condition for reporting at least one of the service link propagation distance information, the service link propagation delay information, or the signal quality; or a format requirement for reporting at least one of the service link propagation distance information, the service link propagation delay information, or the signal quality.

18. The terminal device according to claim 14, wherein:

the neighbor cell ephemeris data configuration information is neighbor cell ephemeris original data configuration information, or the neighbor cell ephemeris data configuration information is neighbor cell ephemeris original data index identification configuration information.

19. The terminal device according to claim 14, wherein the second information is carried by one of:

system information or dedicated signaling of the terminal device.

20. A network device, comprising a processor and a memory, wherein the memory has a computer program stored thereon, and the processor is configured to invoke and execute the computer program stored in the memory to cause the network device to perform the method according to claim 7.

* * * * *